United States Patent [19]
Oouchi et al.

[11] Patent Number: 5,313,348
[45] Date of Patent: May 17, 1994

[54] MAGNETIC RECORDING/REPRODUCING APPARATUS

[75] Inventors: Kazufumi Oouchi; Shinichi Yasui, both of Saijo, Japan

[73] Assignee: Matsushita Electric Industrial Co., Ltd., Osaka, Japan

[21] Appl. No.: 894,921

[22] Filed: Jun. 8, 1992

[30] Foreign Application Priority Data

Jun. 13, 1991 [JP]  Japan .................................. 3-141623

[51] Int. Cl.$^5$ .............................................. H04N 7/10
[52] U.S. Cl. .................................................... 360/84
[58] Field of Search .................................... 360/85, 84

[56] References Cited

U.S. PATENT DOCUMENTS 4,739,421  4/1988  Narasawa ............................. 360/85
5,126,909  6/1992  Mototake et al. ................. 360/85 X Primary Examiner—Richard E. Gluck
Attorney, Agent, or Firm—Stevens, Davis, Miller & Mosher

[57] ABSTRACT

A magnetic recording/reproducing apparatus includes a main printed circuit board on which at least a part of a signal processing circuit is provided, a frame into which the main printed circuit board is fixed, a chassis on which a rotary head cylinder carrying a magnetic head, a supply reel table, a take-up reel table, and at least one motor for driving the cylinder, the supply reel table, and the take-up reel table are mounted, and a hinge mechanism for providing an electrical connection between the main printed circuit board and the chassis and for permitting the chassis to pivot between a first position in which said chassis, at a part of a bottom thereof, is in contact with and in parallel to the main printed circuit board and a second position in which the chassis is apart from the main printed circuit board to project out from the frame.

3 Claims, 4 Drawing Sheets

MAGNETIC RECORDING/REPRODUCING APPARATUS

FIELD OF THE INVENTION AND RELATED ART STATEMENT

The present invention relates to a magnetic recording/reproducing apparatus, and more particularly to a magnetic recording/reproducing apparatus which can simplify the electrical wiring on an assembling operation and facilitate the repairing and adjustment operation of the apparatus.

A conventional magnetic recording/reproducing apparatus includes a chassis, a printed circuit board, and a frame incorporating therein the chassis and the printed circuit board. The chassis is mounted with motors for operating a magnetic tape driving mechanism and a cylinder head driving mechanism. A plurality of electric circuits are printed on the printed circuit board for controlling and/or driving the above-mentioned motors. A plurality of lead wire groups are provided between the chassis and the printed circuit board, each of which electrically connects separately the respective motor with the corresponding electric circuit at various locations of the apparatus.

According to this arrangement, the assembling operation becomes complicated and requires much time for electrical connection. Especially, it is very difficult to assemble the apparatus by means of an automatic assembling machine. Further, it is also difficult to inspect a backside of the chassis during a repairing and adjusting operation after the assembly of the apparatus.

OBJECT AND SUMMARY OF THE INVENTION

An object of the present invention is to provide a magnetic recording/reproducing apparatus which can overcome the above-mentioned drawbacks.

To this end, according to the present invention, there is provided a magnetic recording/reproducing apparatus which comprises a rotary head cylinder carrying a magnetic head for reading/writing data on a magnetic tape; a main printed circuit board on which at least a part of a circuit for processing signals from the magnetic head is provided; a frame into which the main printed circuit board is fixed; a chassis on which the rotary head cylinder, a supply reel table, a take-up reel table, and at least one motor for driving the cylinder, the supply reel table, and the take-up reel table are mounted; a second printed circuit board electrically connected to the driving motor and the magnetic head and fixed to one side edge of the chassis; and a hinge mechanism for providing an electrical connection between the main printed circuit board and the second printed circuit board, the hinge mechanism including a first hinge member attached to the main printed circuit board and a second hinge member attached to the second printed circuit board, these hinge members being detachably engaged with each other, and the hinge mechanism permitting the chassis to pivot between a first position in which the chassis, at a part of a bottom thereof, is in contact with and in parallel to the main printed circuit board and a second position in which the other side edge of the chassis is spaced apart from the main printed circuit board to project out from the frame.

DETAILED DESCRIPTION OF THE PREFERRED EMBODIMENTS

Figure 1:
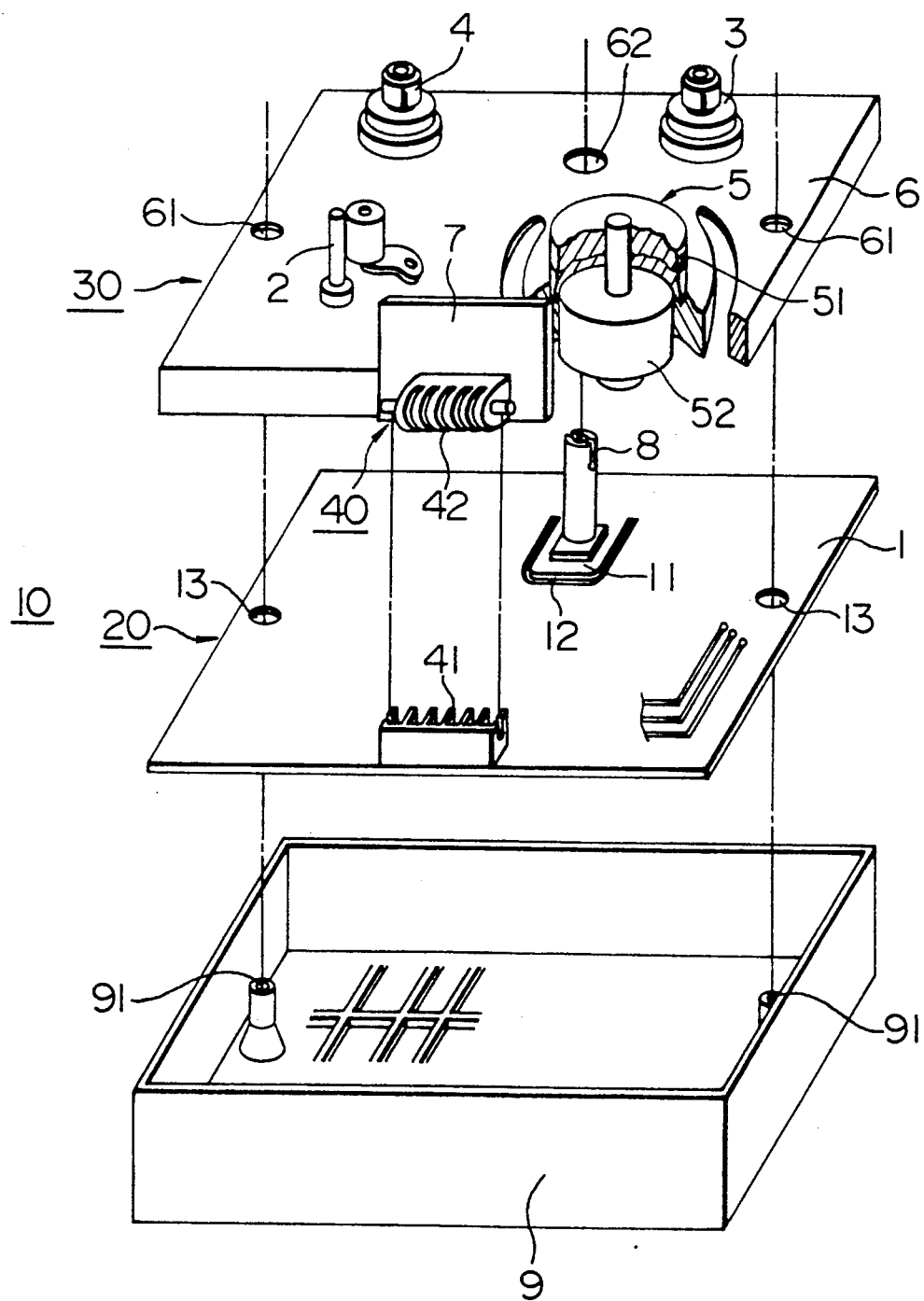
FIG. 1 is an exploded perspective view showing a magnetic recording/reproducing apparatus according to an embodiment of the present invention.

Referring to FIG. 1, a rotary head type magnetic recording/reproducing apparatus 10 according to one embodiment of the present invention generally comprises an electric part 20 and a mechanical part 30. The electric part 20 includes a data processing unit for processing recording and reproducing signals, and a control unit for controlling the data processing unit and the mechanical part 30. The electric part 20 is located on a main printed circuit board 1.

The mechanical part 30 includes a mechanism for driving a magnetic tape and a mechanism for driving a head cylinder. The tape driving mechanism includes a capstan 2, a supply reel table 3, a take-up reel table 4, and motors (not shown) for driving the respective above-mentioned elements. The head cylinder driving mechanism includes a rotary head cylinder 5 carrying thereon a magnetic head 51, and a motor 52 therefor. The mechanical part 30 is mounted on a chassis 6. A second printed circuit board 7 is fixed to a side edge of the chassis 6. The second printed circuit board 7 is electrically connected to the motors of the tape driving mechanism and the magnetic head of the rotary head cylinder 5. Namely, the wiring is gathered up to the second printed circuit board 7.

The apparatus 10 further comprise a hinge mechanism 40. The hinge mechanism 40 includes a first hinge member 41 attached and electrically connected to the main printed circuit board 1, and a co-operative second hinge member 42 attached and electrically connected to the upright second printed circuit board 7. As described hereinafter, it is the hinge mechanism 40 that electrically connects the main printed circuit board 1 with the second printed circuit board 7. Therefore, an electrical connection between the main printed circuit board and the second printed circuit board (namely, the motors of the tape driving mechanism and the magnetic head of the rotary head cylinder 5) is carried out only by providing an engagement between the first and second hinge members. Such engagement can be automatically conducted by means of an assembly machine.

Figure 5:
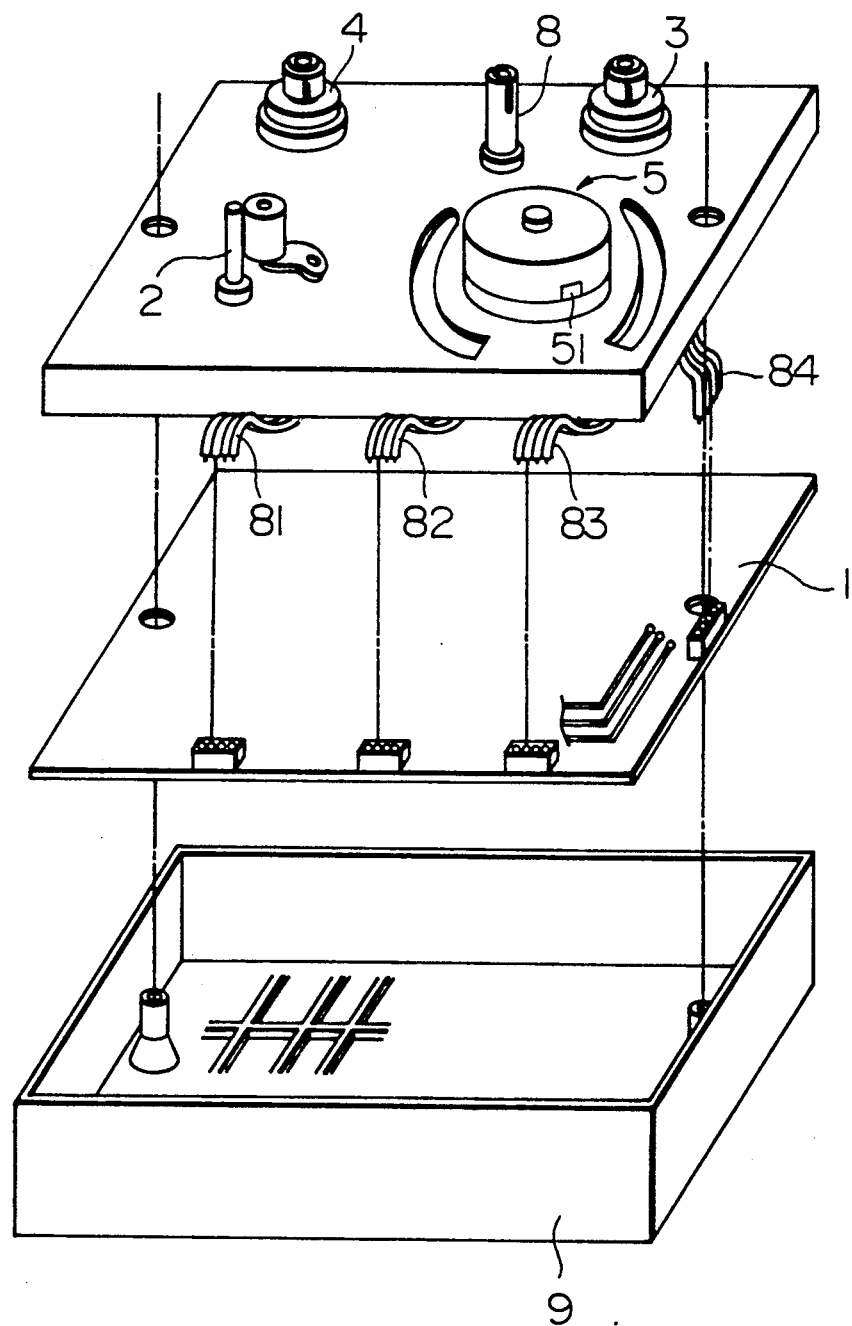
FIG. 5 is an exploded perspective view showing a conventional magnetic recording/reproducing apparatus.

To the contrary, in the conventional apparatus, as shown in FIG. 5, a plurality of lead wires 81–84 are provided so as to electrically connect the motors of the tape driving mechanism and the magnetic head of the rotary head cylinder 5 with the electric circuits on the printed circuit board 1, respectively. Therefore, an electrical connection between the motors and the printed circuit board is carried out by providing an engagement between the lead wire and a socket one by one. This requires much time for assembling, and no machine assembling is available.

Figure 2:
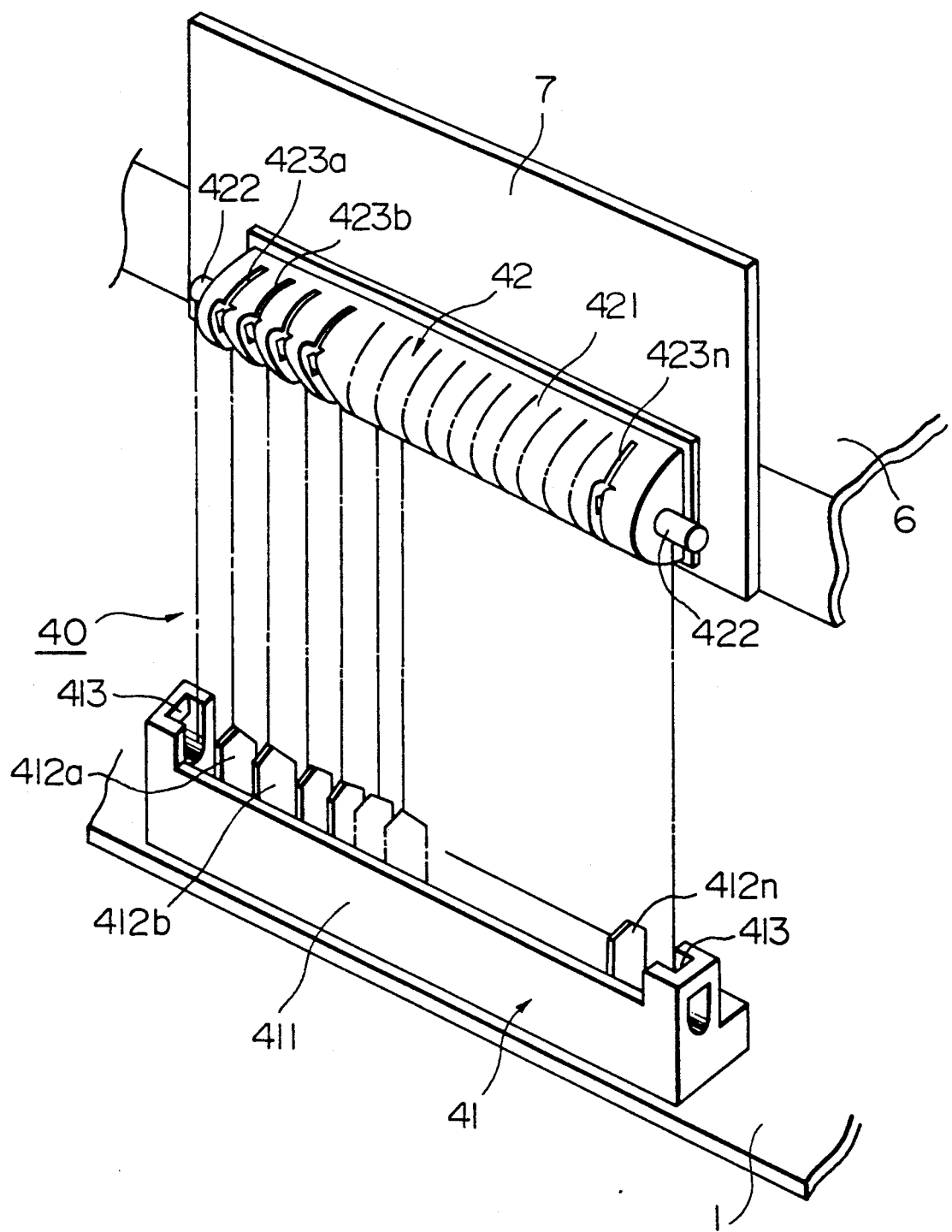
FIG. 2 is an enlarged exploded perspective view showing a hinge mechanism shown in FIG. 1.

Referring to FIG. 2, the hinge mechanism 40 will be described in detail hereinafter.

The first hinge member 41 includes an electrical insulation substrate 411, N terminal plates 412a–412n (N is an arbitrary integer) embedded in the substrate 411, which are spaced apart and insulated from one another, and a pair of bearing recesses 413 provided at both ends of the substrate 411. The terminal plates 412a–412n are electrically connected to the respective electric circuits printed on the main printed circuit board 1.

The second hinge member 42 includes a semi-cylindrical electrical insulation substrate 421, a pair of rods 422 projecting from opposite ends of the substrate 421, a plurality of slits 423a–423n provided in the substrate 421, into which the respective terminal plates 412a–412n of the substrate 411 are to be detachably inserted, and terminals (not shown) provided in the slits 423a–423n, respectively, which terminals are to be contact with the terminal plates 412a–412n, respectively when the first hinge member 41 and the second hinge member 42 are engaged with each other. The terminals of the second hinge member 42 are electrically connected to the motors of the tape driving mechanism and the magnetic head of the rotary head cylinder 5 through the secondary printed circuit board 7.

When the second hinge member 42 together with the chassis 6 is moved close to the first hinge member 41, and then the terminal plates 412a–412n are inserted into the respective slits 423a–423n, the rods 422 are received within the bearing recesses 413 so as to provide the hinge mechanism 40 in which the chassis 6 is pivotal around the rods 422 and through which the main printed circuit board 1 is electrically connected with the secondary printed circuit board 7.

Referring back to FIG. 1, according to this embodiment, an optical sensor 8 for detecting ends of the magnetic tape is provided on the main printed circuit board 1, while such sensor is located on the chassis in the conventional arrangement shown in FIG. 5. The sensor 8 is located on a flexible tongue portion 11 separated by a U-shaped slit 12, and is electrically connected to an electric circuit on the main printed circuit board 1. Since the sensor is not required to be disposed with high accuracy relative to another elements, it can be possible to locate the sensor 8 on the flexible tongue portion 11.

The apparatus 10 is assembled by the following process.

First, the main printed circuit board 1 is disposed on a frame 9 so that mounting holes 13 of the main printed circuit board 1 are aligned with thread portions 91 of the frame 9. Secondly, the chassis 6 is laid on the main printed circuit board 1 so that the second hinge member 42 of the chassis 6 engages with the first hinge member 41 of the printed circuit board 1 so as to provide a hinge mechanism 40. Simultaneously, mounting holes 61 of the chassis 6 become aligned with thread portions 91 of the frame 9, and the sensor 8 projects through a hole 62 of the chassis 6 so as to correctly locate an optical axis of the sensor 8. Finally, these are assembled together into the apparatus 10 by means of screws (not shown).

Figure 3:
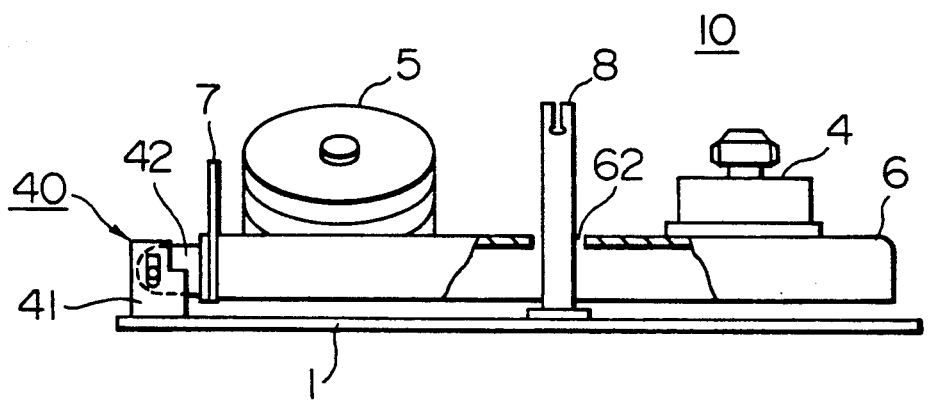
FIGS. 3 and 4 are a fragmentary sectional side views showing the apparatus shown in FIG. 1 in an operation condition and a regulation condition, respectively.

On an operation of the apparatus 10, as shown in FIG. 3, the main printed circuit board 1 and the chassis 6 are parallel to each other, and the first and second hinge members 41 and 42 are coupled with each other, thereby electrically connecting the motors on the chassis 6 with the main printed circuit board 1. Further, the optical sensor 8 is upright from the main printed circuit board 1 through the hole 62 of the chassis 6 and located at a predetermined level for detecting the ends of the magnetic tape.

Figure 4:
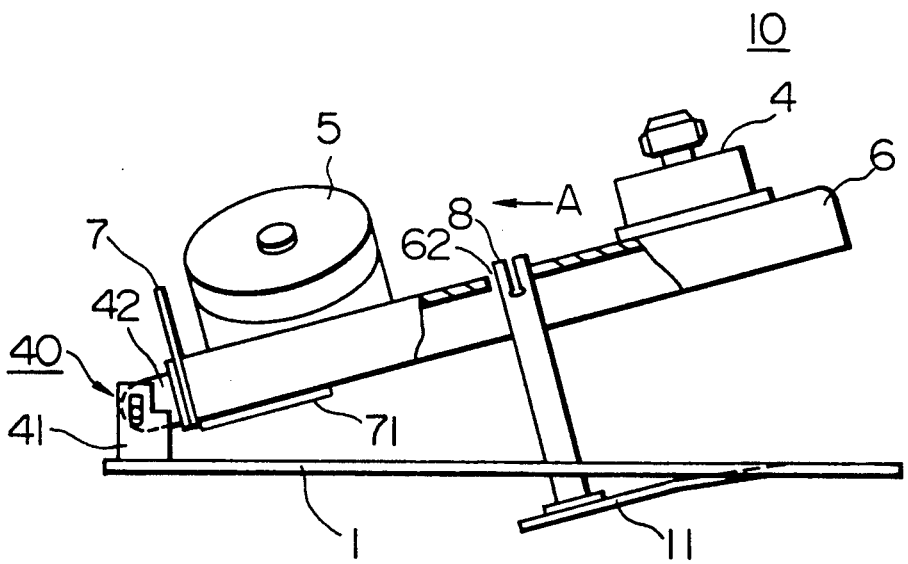

To the contrary, during a repairing or adjustment operation of the apparatus 10, as shown in FIG. 4, the chassis 6 is pivoted around the rods 422 through the hinge mechanism 40 so as to be angularly spaced from the main printed circuit board 1. In this occasion, since the driving motors on the chassis 6 are kept in a condition of being electrically connected to the main printed circuit board 1 through the hinge mechanism 40 and electrical connection 71, it is possible to inspect the back side of the chassis 6 with operating such driving motors. According to this, the repairing or adjustment operation can be readily carried out. Further, the assembly operation is simple, thereby permitting the apparatus to be assembled by the automatic assembling machine.

Incidentally, on the pivotal movement of the chassis 6, the optical sensor 8 is urged by a reaction force from a periphery of the hole 62 of the chassis 6 in a direction designated by an arrow A and then is adapted to be somewhat deformed. However, in this embodiment, the flexible tongue portion 11 is deformed to absorb such reaction force, thereby permitting the chassis 6 to pivot without deformation of the optical sensor 8.

What is claimed is:

1. A magnetic recording/reproducing apparatus comprising:
   a rotary head cylinder carrying a magnetic head for reading/writing data on a magnetic tape;
   a main printed circuit board on which at least a part of a circuit for processing signals from said magnetic head is provided;
   a frame on which said main printed circuit board is fixed;
   a chassis on which said rotary head cylinder, a supply reel table, a take-up reel table, and at least one motor for driving said cylinder, said supply reel table, and said take-up reel table are mounted;
   a second printed circuit board electrically connected to said driving motor and said magnetic head and fixed to one side edge of said chassis; and
   a hinge mechanism for providing an electrical connection between said main printed circuit board and said second printed circuit board, said hinge mechanism including a first hinge member attached to said main printed circuit board and a second hinge member attached to said second printed circuit board, said first and second hinge members being detachably engaged with each other and permitting said chassis to pivot between a first position in which said chassis contacts said main printed circuit board at a part of a bottom of said chassis which is parallel to said main printed circuit board and a second position in which the chassis is spaced apart from the main printed circuit board to project out from the frame.

2. An apparatus according to claim 1, wherein said first and second hinge members are so arranged that they are detachably engageable with each other by means of relative movement of said second hinge member close to or apart from said first hinge member.

3. An apparatus according to claim 1, wherein said apparatus further includes a projection member projecting out from said chassis through a hole provided therein when said chassis is in said second position, and wherein said projection member is disposed on a portion of said main printed circuit board corresponding to said hole on said chassis, said portion being separated by a U-shaped slit from the remaining portion of said main printed circuit board.

* * * * *